Sept. 20, 1960     T. A. BROWN     2,953,182
SKID CHAIN DEVICE FOR AUTOMOTIVE VEHICLES
Filed Oct. 16, 1959     2 Sheets-Sheet 1
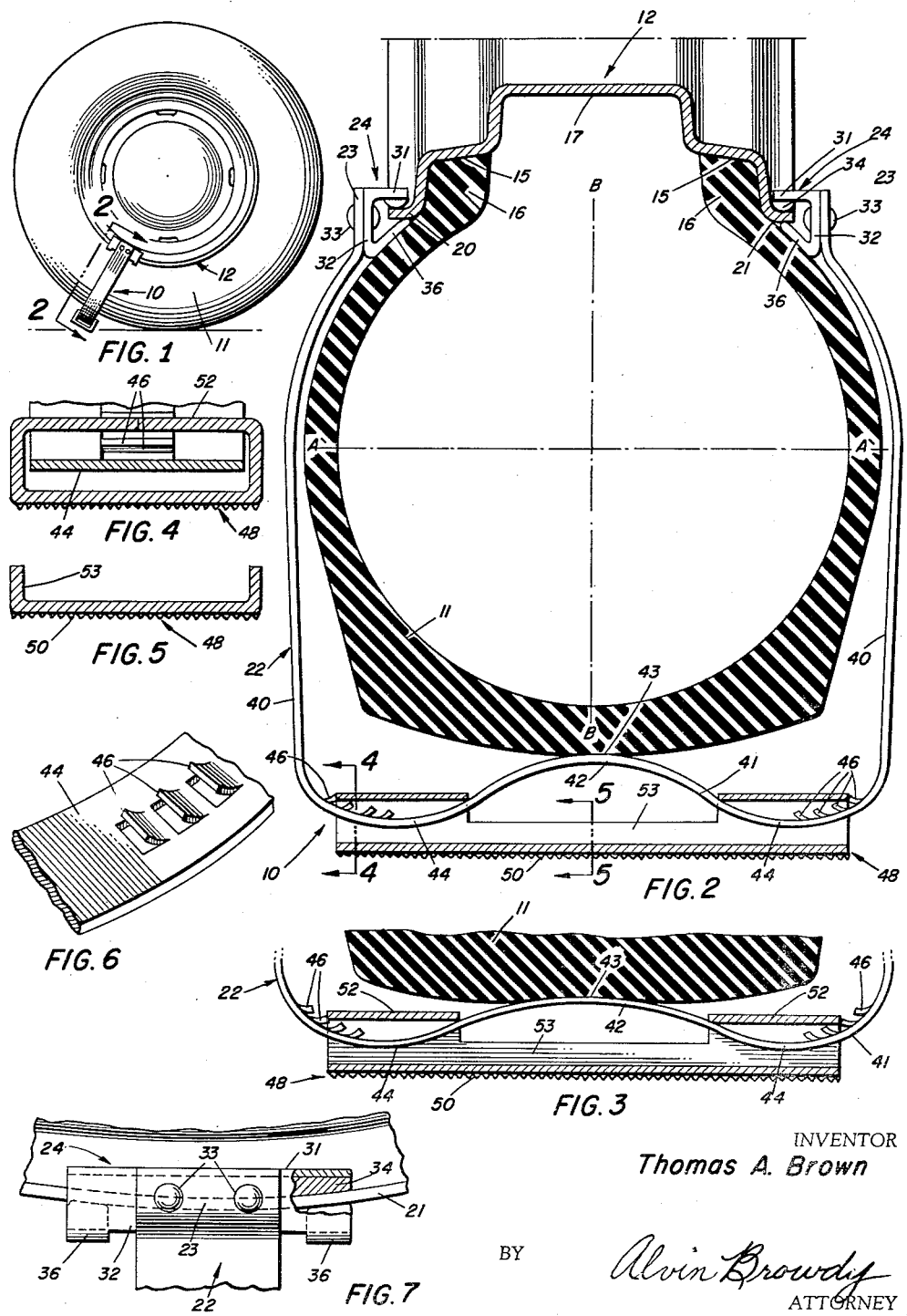
INVENTOR
Thomas A. Brown
BY
Alvin Browdy
ATTORNEY Sept. 20, 1960    T. A. BROWN    2,953,182
SKID CHAIN DEVICE FOR AUTOMOTIVE VEHICLES
Filed Oct. 16, 1959    2 Sheets-Sheet 2
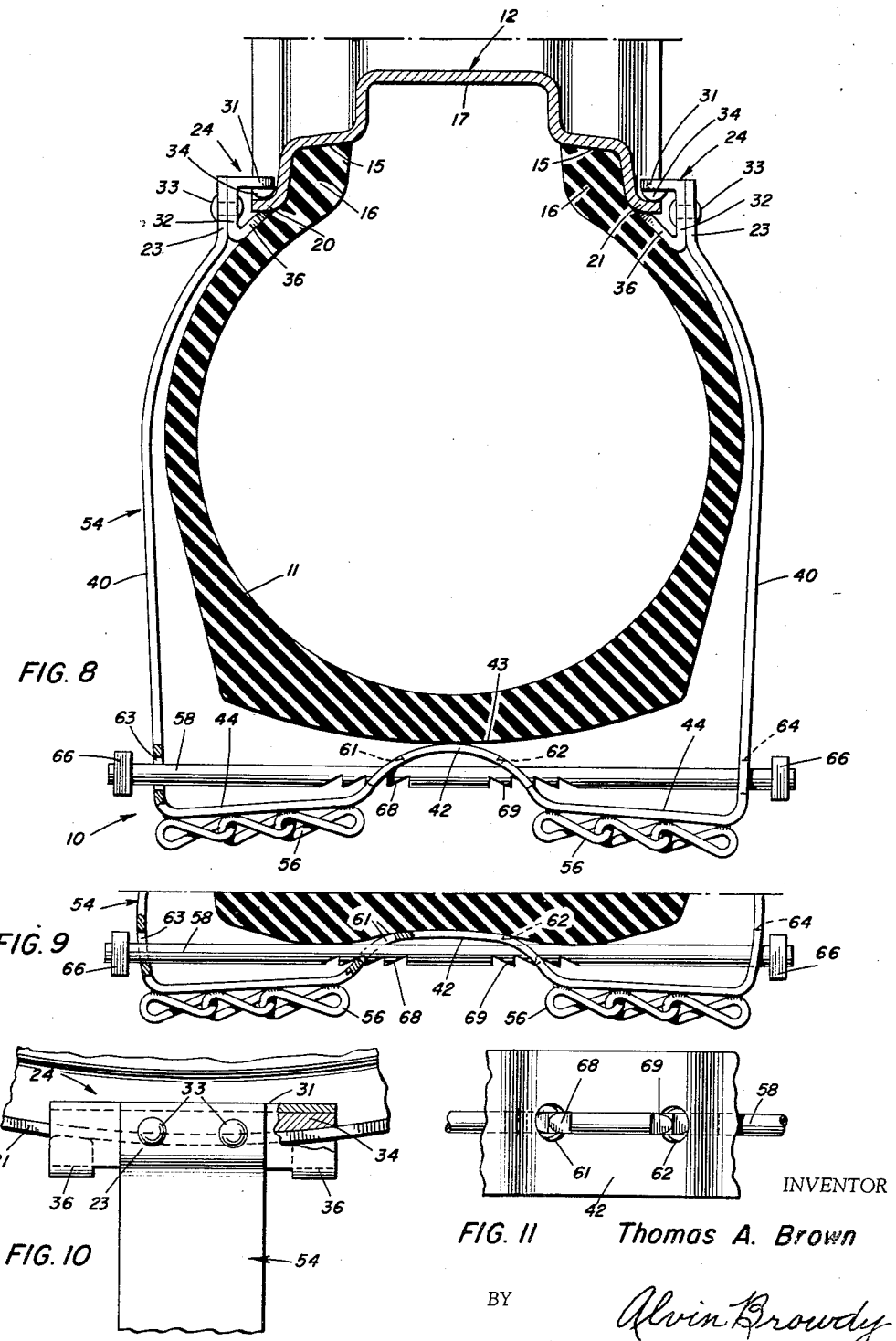
INVENTOR
Thomas A. Brown
BY
Alvin Browdy
ATTORNEY United States Patent Office 2,953,182
Patented Sept. 20, 1960

2,953,182
SKID CHAIN DEVICE FOR AUTOMOTIVE VEHICLES

Thomas A. Brown, Pasadena, Md.

Filed Oct. 16, 1959, Ser. No. 846,950

9 Claims. (Cl. 152—226)

This invention relates to skid chains for automotive vehicles having resilient compressible tires, such as pneumatic tires.

This application is a continuation-in-part of applicant's co-pending application Serial No. 791,310, filed February 5, 1959 and now abandoned.

One type of skid chain presently used on automotive vehicle wheels is commonly referred to as a strap type of skid chain. It consists of several strands of flexible chain held in place across the tire tread by a flexible strap attached to one end of the chains, and threaded through a slot provided in the wheel and thereafter secured to a clamp attached to the other end of the chains. This type of skid chain is difficult to attach to automotive wheels due to the fact that the strap had to be threaded through the slot from the inside of the wheel in order to secure the strap in the clamp positioned on the outer side of the wheel. Moreover, wheels provided on many recent automotive vehicles either have not been provided with slots for strap type skid chains or they have been provided with large wheel covers which must be removed in order to use strap type skid chains. In view of these conditions, it is desirable to design a strap-type skid chain that can be attached firmly to the rim of an automotive vehicle wheel without the use of a strap passing over the rim of the wheel or without any other device attached to the rim of the wheel.

The principal object of this invention is to provide a skid chain device which can be readily attached to and detached from an automotive vehicle wheel having the usual standard rim, and which will not chafe the side walls of the tire during rotation of the wheel.

A further object of the invention is to provide a skid chain device which can be secured to the rim of a conventional wheel of an automotive vehicle without the use of a strap or similar device for holding the skid chain on the wheel.

Still another object of the invention is to provide a skid chain device for automotive vehicle wheels having means for automatically locking the device tightly on the rim of the wheel the first time the device is subjected to the weight of the vehicle, and which remains in the locked position until the locking means is manually released.

With these objects in view, and some others which will be obvious from the detailed description hereinafter, the invention broadly considered, comprises a generally U-shaped resilient member designed to fit over the tire of an automotive vehicle wheel in a radially aligned position with respect to the center of the wheel, means provided on the free end of each leg of the resilient member for engaging the inner and outer peripheral surfaces of the rim on opposite sides of the wheel, the generally U-shaped resilient member being so designed that when it is subjected to the weight of the vehicle the opposed legs thereof are deformed inwardly in such a manner that the rim engaging members are urged tightly against the peripheral surfaces of the rim, and means for automatically locking the resilient member in the deformed condition to retain the skid chain device on the wheel. The locking means is arranged to be manually released in order that the skid chain device may be readily removed from the wheel.

Preferred embodiments of the invention, applicable to an automotive vehicle wheel having a standard drop center rim and carrying a pneumatic tire having the usual straight side beads will now be described in detail in connection with the accompanying drawings in which:

Fig. 1 is a front elevational view of an automotive vehicle wheel showing an anti-skid device attached thereto;

Fig. 2 is a cross-sectional view along the line 2—2 of Fig. 1 before the weight of the automobile has been applied;

Fig. 3 is a fragmentary view similar to Fig. 2 showing the device when the weight of the automobile has been applied;

Fig. 4 is a cross-sectional view along the line 4—4 of Fig. 2;

Fig. 5 is a cross-sectional view along the line 5—5 of Fig. 2;

Fig. 6 is a perspective view of a portion of the U-shaped member;

Fig. 7 is an enlarged fragmentary portion of Fig. 1 showing the clamping device for engaging the anti-skid device with the rim of the wheel;

Fig. 8 is a cross-sectional view as in Fig. 2 showing a modified form of the invention before the weight of the automobile has been applied;

Fig. 9 is a fragmentary view similar to Fig. 8 showing the device when the weight of the automobile has been applied;

Fig. 10 is an enlarged fragmentary elevation showing the clamping device for engaging the anti-skid device with the rim of the wheel; and Fig. 11 is a fragmentary view showing the details of the locking means of the anti-skid device shown in Fig. 8.

Referring now to the drawings, and more particularly to Fig. 2, there is shown a skid chain device, represented in its entirety by the reference numeral 10, positioned over a conventional pneumatic tire indicated generally at 11, and engaging the opposite sides of a conventional drop center rim, indicated generally at 12 of a conventional wheel of an automotive vehicle.

The rim 12 is provided with an outer peripheral surface 15, which includes opposed, substantially straight, sides for receiving the usual bead portions 16—16 of the tire 12, and an inner peripheral surface 17. The outer peripheral surface 15 and the inner peripheral surface 17 terminate on opposite sides of the rim 12 in a manner to form outwardly turned annular flanges 20 and 21. For the purposes of this description the annular flange 20 is considered to be on the inner side of the rim 12 and the annular flange 21 is considered to be on the outer side of the rim 12.

By the terms outer periphery of the rim or outer peripheral surface of the rim, mentioned herein, is meant that surface with which the tire contacts, irrespective of the convolutions of said surface, and by the terms inner periphery of the rim or inner peripheral surface of the rim is meant that surface of the rim to which the disc of a wheel is attached.

The skid chain device 10 comprises a substantially U-shaped steel band, indicated generally at 22, preferably formed into the shape shown in Fig. 2, and thereafter treated by conventional means to produce a tough and highly resilient steel band having the characteristics of "spring steel." The free ends 23 of the resilient band 22 are attached to rim engaging lugs, indicated generally at 24.

The lugs 24 which are identical in construction are substantially angle-shaped, wherein the leg 31 thereof is designed to fit over the flange 20 of the rim, as shown in Fig. 2, and the adjacent leg 32 has the end 23 of the resilient band 22 secured thereto by a rivet 33. A pad 34, made of suitable anti-friction material is secured to the leg 31 so as to engage the inner surface of the rim, and is shaped to engage the entire portion of the peripheral surface of the rim encompassed by the lug 24 (Fig. 7). The friction pad 34 is provided on the lug 24 to maintain a firm grip on the flange 20, and at the same time prevent the lug from scarring the rim. The leg 32 carries a pair of fingers 36—36, one finger 36 being positioned at each end of the lug as shown in Fig. 7. The fingers 36—36 preferably are formed integrally with the leg 32 at an acute angle with the leg 32 so that they rest against the adjacent surface of the tire 11 with the free end thereof engaging the outer peripheral surface 15 of the rim adjacent to the flange 20, as seen in Fig. 2. The edge of the free end of the fingers is tapered slightly to enable the fingers to project well into the space between the tire and the outer peripheral surface 15 of the rim.

In order to clearly describe one of the salient features of this invention, it is desirable to consider the U-shaped resilient band 22 as including opposed legs 40—40 positioned adjacent to but spaced away from the side walls of the tire 11, and a transverse leg 41 provided with an arcuate projection 42 which engages the central portion of the tread 43 of the tire.

The resilient band 22 is so formed that the opposed legs 40—40 normally assume positions (not shown) in which the lugs 24 nearly engage each other. This initial shape of the band 22 causes the lugs to firmly engage the rim 12 when the legs 40—40 are spread apart in the process of sliding the open end of the band over the tire and into engagement with the rim.

In combination with the initial shape of the band 22, each leg 40 has an arcuate portion extending outwardly from the free end thereof to the axis A—A of the tire, from which point each leg 40 may be substantially flat, but sloping slightly inwardly toward axis B—B of the tire 11. This particular shape of the legs 40—40 is critical for the reason that when the resilient band 22 is subjected to the weight of an automotive vehicle, that is, when the arcuate projection 42 of the leg 41 is positioned between the tread of the tire and the road surface, the arcuate projection 42 flattens as shown in Fig. 3 and the relatively flat portions 44 of the leg 41 move outwardly in a direction substantially parallel to the A—A axis. This movement of the flat portions of the leg 41 urges the fingers 36—36 of the lugs 24 tightly between their flanges 20 and 21 and the adjacent surface of the tire 11. This flexing of the resilient band 22 forces the free ends 23 of the resilient band inwardly and thereby causes the lugs 24 to exert considerable pressure against their respective flanges 20 and 21 of the rim. This outward flexing of the legs 40—40 also increases the clearance between the legs and the side walls of the tire and thereby allows for the usual deformation of the tire when it is subjected to the weight of the vehicle.

The flat portions 44 of the leg 41 are each provided with a plurality of teeth 46 extending upwardly therefrom in a direction toward the tire. These teeth 46, as shown in Fig. 6, may be cut from the metal of the flat portion 44 and then bent upwardly. Of course, it should be understood that if desired, the teeth 46 may be formed in any suitable manner, as by welding onto the metal.

A locking and anti-skid member 48 is attached to the leg 41 of the resilient band 22. The member 48 is adapted to contact the ground and is provided with anti-skid means 50 on its lower surface. This may be in the form of roughed serrations, attached chains or an other suitable mechanism to prevent skidding. The locking member 48 is generally rectangular in cross section at each end portion 52 thereof, as shown in Fig. 4, and the central portion 53 is open at the top, as shown in Fig. 5. Each rectangular portion 50 encloses a flat portion 44 of the leg 41 with the arcuate projection 42 extending upwardly through the central portion 53 of the locking member 48.

The locking member 48 is adapted to engage the teeth 46 by the upper outer corners thereof, as shown in Fig. 3, thereby locking the resilient member 22 in position and preventing its return when the weight of the automobile has been removed therefrom.

The outward movement of the flat portions 44 when the weight of the automobile is first applied causes the flat portion 44 and its teeth 46 to slide past the upper outer edge of the locking member much in the same manner as a conventional ratchet and pawl mechanism. Thus, when the flat portions 44 move outwardly with respect to the B—B axis of the tire, the teeth 46 are arranged to move freely past the upper outer edges of the locking member. However, when the band is no longer subjected to the weight of the vehicle and tends to return to its normal position, the teeth are engaged by the upper outer edges of the locking member and thereby lock the resilient band 22 in its flexed or deformed condition. When the band is so locked by the locking member 48, the lugs 24 are held firmly against the rim, and the skid chain device 10 will remain on the wheel during rotation of the wheel at normal speeds.

The resilient band 22 may be unlocked from its deformed condition by simply inserting a screw driver between the flat portion 44 and the locking member 48 and turning it until the locking bar and the teeth are disengaged, in which case the band returns to the position substantially as shown in Fig. 2.

Operation

The skid chain device 10 is attached to the wheel of an automotive vehicle in the following manner: The legs 40—40 of the resilient band 22 are held apart manually and the open end of the resilient band is passed over the tire 11 until the lugs 24 engage the side walls of the tire at some point beyond the axis A—A of the tire. After the skid chain device 10 has been so positioned on the tire, pressure is applied to the leg 41 of the band to urge the lugs 24 into engagement with the flanges 20 and 21. The inherent resiliency of the band 22 causes the lugs to follow the side walls of the tire as the band is pushed over the tire, and as a result the fingers 36—36 of each lug engage the outer peripheral surface 15 of the rim. When the fingers 36—36 of each lug engage the rim as described, pressure is applied to each lug sufficient to position the friction pad 34 attached to the leg 32 thereof into engagement with the inner peripheral surface 17 of the rim 12, as shown in Fig. 2. When the lugs 24 engage the flanges 20 and 21 of the rim in the manner described, the resilient band 22 of the skid chain device 10 is radially aligned with the center of the wheel.

The lugs 24 are designed for a given size wheel so that the fingers 36—36 bear on the flanges 20 and 21 of the rim at points disposed to either side of the center of the resilient band and prevent the skid chain device 10 from rocking back and forth when the device repeatedly engages the road surface. Also, the skid chain device is designed to fit various sizes of tires so that when it is properly secured on the rim 12 the arcuate projection 42 engages the tread 43 of the tire 11, and the flat portions of the leg 41 extending to either side of the arcuate projection slope away from the axis A—A of the tire.

When the skid chain device 10 is positioned on the rim 12 as described, the locking member 48 is resting loosely on the resilient band 22. When the skid chain device is subject to the weight of the vehicle, that is, when the leg 41 is positioned between the tire and the road due to rotation of the wheel, the legs 40—40 of the resilient band bow outwardly due to the movement of the flat portions 44 of the leg 41 in a substantially horizontal direction, and the teeth move with respect to the locking member 48. As the leg 41 moves out of engagement with the road surface, the band 22 tends to return to its normal shape, but the edge of the locking member 48 engages the teeth in the leg 41, whereby the locking member holds the band 22 in its deformed shape. When the legs 40—40 are bowed outwardly as described, they tend to bend at or near a point where the axis A—A would intersect the legs, thereby urging the lugs 24 inwardly with considerable pressure against the flanges 20 and 21 of the rim. The band 22 is locked in its deformed condition so that it will retain a tight grip on the rim as the wheel is rotated at speeds normal for the operation of automotive vehicles during weather conditions which require the use of skid chain devices, such as ice or snow.

When it is desirable to remove the skid chain device 10, a screw-driver is inserted between the locking bar and the band and is twisted to release the teeth from the edges of the bar, whereupon the legs 40—40 and the leg 41 return to the positions shown in Fig. 2. Thereafter, the skid chain device may be readily removed from the wheel.

A modified form of the invention is shown in Figs. 8 to 11. In this form of the invention the resilient U-shaped band 54 is essentially similar to the band 22 in its shape and clamping means. The lower surfaces of the flat portions 44 of the leg 41 are provided with anti-skid means 56 which engage the ground. The locking bar 58 passes through bores 61 and 62 provided in the arcuate projection 42 of the resilient band 22. The bar 58 also passes through slots 63, 64 provided in the legs 40 of the resilient band. A square nut 66 is provided on each end of the bar 58 to retain the bar on the resilient band 22. The bar 58 is provided with a series of teeth 68 for engaging the edge of the bore 61 and a series of teeth 69 for engaging the edge of the bore 62. The anti-skid means 56 may comprise several strands of chain as illustrated in Figs. 8 and 9.

When the weight of the vehicle is applied to the anti-skid device, the arcuate portion is flattened somewhat to the position shown in Fig. 9, whereby the opposite sides of the arcuate portion slide past the teeth 68, 69 of the locking bar 58. However, when the band is no longer subjected to the weight of the vehicle and tends to return to its normal position, the teeth 68, 69 of the locking bar 58 engage the adjacent edges of the bores 61 and 62, respectively, and thereby lock the resilient band 22 in its flexed or deformed condition, thus firmly holding the lugs 24 against the rim during rotation of the wheel.

It will be obvious to those skilled in the art that various changes may be made without departing from the spirit of the invention and therefore the invention is not limited to what is shown in the drawings and described in the specification, but only as indicated in the appended claims.

What is claimed is:

1. A skid chain device for automotive vehicle wheels having rims and compressible resilient tires which comprises, a substantially U-shaped resilient band designed to fit over the tire of an automotive vehicle, a member attached to each end of the U-shaped band for engaging the inner peripheral edge of the rim of the wheel and for engaging the surface of the tire adjacent to the outer peripheral surface of the rim, said resilient U-shaped band being so formed that when the U-shaped band is subjected to the weight of the vehicle the opposed side portions of the band bow outwardly away from the side wall of the tire and thereby urge the rim engaging members tightly against the rim, locking means engaged by the U-shaped band for locking the band in the bowed condition and thereby secure the band to the wheel, and anti-skid means on the ground engaging portions of the device.

2. A skid chain device for automotive vehicle wheels having rims and compressible resilient tires which comprises a resilient band designed to fit over the tire of an automotive vehicle wheel in a radially aligned position with respect to the center of the wheel, means provided on the free ends of the resilient band for engaging the inner peripheral edge of the rim of the wheel and for engaging the outer peripheral edge of the rim at a point where the tire engages the rim, said resilient band being so formed that the free ends thereof must be urged outwardly in order to position the member over the tire, whereby the rim engaging members normally are urged against the rim, said resilient band being so designed that when the resilient band is subjected to the weight of the vehicle the opposed side portions bow outwardly away from the adjacent side walls of the tire so as to urge the rim engaging members tightly against the rim, and locking means adapted to be engaged by the resilient band for locking the resilient band in the bowed condition and thereby secure the band to the wheel.

3. A skid chain device for automotive vehicle wheels having rims and compressible resilient tires which comprises a resilient band designed to fit over the tire of an automotive vehicle wheel in a radially aligned position with respect to the center of the wheel, means provided on the free ends of the resilient band for engaging the inner peripheral edge of the rim of the wheel and for engaging the outer peripheral edge of the rim at a point where the tire engages the rim, said resilient band being so formed that the free ends thereof must be urged outwardly in order to position the band over the tire, whereby the inherent tension of the free ends thereof normally urges the rim engaging members against the rim, said resilient band being so designed that when the resilient band is subjected to the weight of the vehicle the opposed side portions bow outwardly away from the adjacent side walls of the tire so as to urge the rim engaging members tightly against the rim, and locking means adapted to be engaged by the resilient band for locking the resilient band in the bowed condition and thereby secure the band to the wheel, and anti-skid means on the ground engaging portions of the device.

4. A skid chain device for automotive vehicle wheels having rims and compressible resilient tires which comprises, a U-shaped resilient band including side legs and a transverse leg designed to fit over an automotive vehicle tire in a radially aligned position with respect to the center of the tire, means provided on each free end of the resilient band for engaging the inner peripheral surface of the rim and for simultaneously engaging the outer peripheral surface of the rim at a point where the tire engages the rim, said resilient band being so formed that the free ends of the opposed legs are spaced apart a distance substantially less than the transverse diameter of the tire and must be spread apart to fit the band over the tire whereby the inherent tension in the band urges the rim engaging members against the peripheral surfaces of the rim, said resilient band having the central portion of the transverse leg curved inwardly to engage the tread portion of the tire, whereby when the resilient band is subjected to the weight of the vehicle the concave portion is deformed and causes the side legs of the resilient band to bow outwardly and urge the rim engaging members tightly against the peripheral surfaces of the rim, locking means adapted to be engaged by the resilient band for locking the resilient band in the bowed condition to hold the resilient band securely on the rim, and anti-skid means on the ground engaging portions of the device.

5. A skid chain device for automotive vehicle wheels having rims and compressible resilient tires which comprises, a U-shaped resilient band including side legs and a transverse leg designed to fit over an automative vehicle tire in a radially aligned position with respect to the center of the tire, means provided on each free end of the resilient band for engaging the inner peripheral surface of the rim and for simultaneously engaging the outer peripheral surface of the rim at a point where the tire engages the rim, said resilient band being so formed that the free ends of the opposed legs are spaced apart a distance substantially less than the transverse diameter of the tire and must be spread apart to fit the band over the tire whereby the inherent tension in the band urges the rim engaging band against the peripheral surfaces of the rim, said resilient band having the central portion of the transverse leg curved inwardly to engage the tread portion of the tire, whereby when the resilient band is subjected to the weight of the vehicle the concave portion is deformed and causes the side legs of the resilient band to bow outwardly and urge the rim engaging members tightly against the peripheral surfaces of the rim, locking means slidably engaged by the transverse leg portion of the band for locking the resilient band in the bowed condition to hold the resilient band securely on the rim, and anti-skid means on the ground engaging portions of the device.

6. A skid chain device for automotive vehicle wheels having rims and compressible resilient tires which comprises, a U-shaped resilient band including side legs and a transverse leg designed to fit over an automotive vehicle tire in a radially aligned position with respect to the center of the tire, means provided on each free end of the resilient band for engaging the inner peripheral surface of the rim and for simultaneously engaging the outer peripheral surface of the rim at a point where the tire engages the rim, said resilient band being so formed that the free ends of the opposed legs are spaced apart a distance substantially less than the transverse diameter of the tire and must be spread apart to fit the band over the tire whereby the inherent tension in the band urges the rim engaging members against the peripheral surfaces of the rim, said resilient band having the central portion of the transverse leg curved inwardly to engage the tread portion of the tire, whereby when the resilient band is subjected to the weight of the vehicle the concave portion is deformed and causes the side legs of the resilient band to bow outwardly and urge the rim engaging members tightly against the peripheral surfaces of the rim, a plurality of teeth on the surface of the transverse leg portion of the band, locking means slidably engaged by the transverse portion of the band adapted to engage said teeth for locking the resilient band in the bowed condition to hold the resilient band securely on the rim, and road gripping means secured to the ground engaging portions of the locking means.

7. A skid chain device in accordance with claim 6 wherein the locking means is rectangular in cross-section adjacent its outer ends thereby enclosing the outer ends of the transverse leg portion with said road gripping means secured to the lower surface of said locking means.

8. A skid chain device for automotive vehicle wheels having rims and compressible resilient tires which comprises, a U-shaped resilient band including side legs and a transverse leg designed to fit over an automotive vehicle tire in a radially aligned position with respect to the center of the tire, means provided on each free end of the resilient band for engaging the inner peripheral surface of the rim and for simultaneously engaging the outer peripheral surface of the rim at a point where the tire engages the rim, said resilient band being so formed that the free ends of the opposed legs are spaced apart a distance substantially less than the transverse diameter of the tire and must be spread apart to fit the band over the tire whereby the inherent tension in the band urges the rim engaging members against the peripheral surfaces of the rim, said resilient band having the central portion of the transverse leg curved inwardly to engage the tread portion of the tire, whereby when the resilient band is subjected to the weight of the vehicle the concave portion is deformed and causes the side legs of the resilient member to bow outwardly and urge the rim engaging members tightly against the peripheral surfaces of the rim, locking means passing through and slidably engaged by the said concave portion of the resilient band for locking the resilient member in the bowed condition to hold the resilient band securely on the rim, and anti-skid means on the ground engaging portions of the device.

9. A skid chain device in accordance with claim 8 wherein the locking means is provided with a plurality of teeth, said concave portion of the resilient band engaging said teeth to lock the resilient member in the bowed condition.

References Cited in the file of this patent

UNITED STATES PATENTS

| | | |
|---|---|---|
| 2,625,193 | La Rocca | Jan. 13, 1953 |
| 2,771,115 | Brown | Nov. 20, 1956 |
| 2,840,132 | Palmer et al. | June 24, 1958 |